United States Patent

Wang et al.

Patent Number: 5,404,298
Date of Patent: Apr. 4, 1995

[54] CHAOS FEEDBACK SYSTEM

[75] Inventors: Bo-Hyeun Wang; In T. Kim; Young H. Roh, all of Kyungki-Do, Rep. of Korea

[73] Assignee: Goldstar Co., Ltd., Seoul, Rep. of Korea

[21] Appl. No.: 111,666

[22] Filed: Aug. 25, 1993

[30] Foreign Application Priority Data

Jun. 19, 1993 [KR] Rep. of Korea ............... 11234/1993

[51] Int. Cl.$^6$ ...................... G05B 13/02; G06F 15/336
[52] U.S. Cl. ................................ 364/152; 364/728.03; 395/11
[58] Field of Search ................. 364/148–178, 364/728.03, 604, 601, 704, 728.05, 819, 807, 820, 131; 380/28, 46; 307/201, 553; 395/3, 11, 21, 23, 903–907, 912–915

[56] References Cited

U.S. PATENT DOCUMENTS

| | | | |
|---|---|---|---|
| 5,007,087 | 4/1991 | Bernstein et al. | 380/46 |
| 5,045,713 | 9/1991 | Shimn | 307/201 |
| 5,048,086 | 9/1991 | Bianco et al. | 380/28 |
| 5,134,685 | 7/1992 | Rosenbluth | 395/21 |

OTHER PUBLICATIONS

Proceedings of the 31st IEEE Conference on Decision and Control, vol. 2, 16 Dec. 1991, Arizona, USA, pp. 2107–2112, X. Feng et al. "A Study of Chaos in Discrete Time Linear Systems with Quantized State Feedback".

Proceedings of the 31st IEEE Conference on Decision and Control, vol. 3, 16 Dec. 1992, Arizona, USA, pp. 2502–2503, X. Dong et al. "Controlling Chaotic Continuous Time Systems Via Feedback".

Proceedings of the 31st IEEE Conference on Decision and Control, vol. 2, 16 Dec. 1992, Arizona, USA, T. Taylor "A Tutorial on Chaos in Control Theory".

Primary Examiner—James P. Trammell
Attorney, Agent, or Firm—Ostrolenk, Faber, Gerb & Soffen

[57] ABSTRACT

A chaos feedback system including a chaotic system capable of analyzing whether an input signal is obtained from a noise or from a meaningful information by analyzing qualitative features of the strange attractor and feed the analyzed result back to the chaotic system so that the chaotic system outputs a desired state. The chaos feedback system includes a chaotic system for deriving a stable state solution from input states, the chaotic system having a strange attractor obtained from the stable state solution, a chaos processor for outputting a correlation dimension to analyze a quantitative feature from a state value of the strange attractor in real time, and a chaos feedback controller part for feeding a result outputted from the chaos processor back to the chaotic system so that the chaotic system outputs a desired state value.

5 Claims, 6 Drawing Sheets

CHAOS FEEDBACK SYSTEM

BACKGROUND OF THE INVENTION

1. Field of the Invention

The present invention relates to a chaos feedback system, more particularly to a chaos feedback system which is able to determine whether an input signal is obtained from a random noise or from a meaningful information by analyzing qualitative features of the strange attractor and feed the analyzed result back to a chaotic system so that the chaotic system outputs a desired state.

2. Description of the Prior Art

Recently, there have been active studies for seeking a process for estimating the future movements of the nature phenomena, such as the flow of water, air, and blood etc., the movement may be predetermined by the mathematically expressed regularity of the movements gained.

Dynamics system can be defined as a system in which its states are varying with respect to time.

The dynamics system is called a stable system when the steady state solution remains in one point, which is in turn called an equilibrium point. When the attractor of the system makes a closed loop, the system is called a periodic system. When the attractor has a shape of doughnut, it is called a quasi-periodic system.

The procedure for obtaining the attractor of the dynamics system will be described as follows.

Generally, an n-th order dynamics system have n state equations, and the state equations indicate the variation ratio of the states of the dynamics system depending on the variation of time as expressed in equation (1).

$$dx1/dt = f(x1, x2, \ldots, xn), \quad (1)$$
$$\ldots$$
$$dxn/dt = f(x1, x2, \ldots, xn)$$

wherein, $f: R^n \to R^n$ represents a nonlinear mapping, and $x1, x2, \ldots, xn$ represent states respectively.

Hereinafter, a pendulum motion will be described as an elemental example of the dynamics system, the pendulum motion is expressed by 2 state equations in that the pendulum motion is a second order dynamics system as follows.

$$dx1/dt = f(x1, x2)$$

$$dx2/dt = f(x1, x2)$$

The solutions of the above state equations consist of a transient solution and a steady state solution. The steady state solution can be expressed in a state space, in which each state variable makes an axis of the state space, so as to express the steady state solution entirely.

Namely, the steady state solution at a give time t can be expressed as a point in the state space. A set of the points presented in the state space is called an attractor of dynamics system.

If the given dynamics system has a finite state, i.e., a finite n-th order dynamics system, the system has a four forms of the attractor. The dynamics systems are classified into four types according to the types of attractor of the dynamics system.

Namely, the steady linear system which is the most simple dynamics system has one point attractor in the state space, which is called an equilibrium point. Also, the dynamics system having the steady state solution, and the solution being a periodic solution, has a closed loop-shaped attractor in the state space, which is then called a limit cycle.

And, the dynamics system having k-th order subharmonic solution, which has k periods, has a doughnut-shaped attractor. The doughnut is called a torus.

The attractor except those of the above-mentioned dynamics systems is a strange attractor, and this type of dynamics system is called a chaos system.

Namely, the chaos system refers to a system having a strange attractor in the state space, with the exception of the one point attractor, the limit cycle, and the torus.

As mentioned above, the attractor may be constructed from the state equation which represents the state of the movements of the nature phenomena. In that case, all the n state equations are known in the n-th order dynamics system, the attractor may be constructed easily.

In fact, however, it is practically impossible to access the whole n state equations let alone state variables, in a given n-th order dynamics system. Accordingly, the endeavor has been devoted to construct the attractor of n-th order dynamics system from only one state variable.

Namely, when an attractor is obtained from the steady state solution of a given state variable, the attractor may be presented in the state space.

Since the desired attractor may not be gained in the state space, an embedding space should be introduced.

As described above, the constructing of the attractor of the n-th dynamics system from a given state variable is called an attractor reconstruction. The attractor reconstruction plays an important role among the researchers who are dependent upon the experiments.

The attractor reconstruction has been proposed by Tarkens in the mid of 1980's.

And, the trace time is divided into the same periods, and the corresponding state value of the divided time is presented as a vector, g(t). The vector g(t) is satisfied with the following equation:

$$g(t) = \{y(t), y(t+\tau), \ldots, y(t+n\tau)\}$$

wherein, y(t) represents a state value, $\tau$ is a delay time divided into the same periods, and n+1 is an embedding dimension.

If the delay time and the embedding dimension are fixed, the vector is expressed as one point. And the delay time and the embedding dimension are altered, then the vector draws a trace in the embedding space.

The vector trace in the given n-th order embedding space may not be exactly the same as the trace of the attractor of the given dynamics system, but the vector trace has relation with the trace of the original dynamics system in the qualitative viewpoint (pattern face).

However, it needs to determine whether the attractor is constructed from a random noise or the meaningful information from chaos system.

There are two kinds of methods for analyzing the reconstructed attractor, one being to analyze the qualitative feature of the reconstructed attractor, which is called a qualitative method, and the other being to analyze the degree of the pattern such as a slope of the attractor, which is called a quantitative method.

In the case that the reconstructed attractor has a pattern of the equilibrium point, the limit cycle, or the torus, it is possible to analyze the attractor only by use of the qualitative method. Where the strange attractor is constructed by the reconstruction, it is impossible to determine whether the attractor is constructed from a noise or a meaningful information only by use of the qualitative process. In this case, therefore, the strange attractor is analyzed by analyzing the quantitative feature of the attractor.

There are various methods in analyzing the quantitative feature of the reconstructed strange attractor such as the procedure for calculating the capacity of the strange attractor, the procedure for gaining an information dimension, and the procedure for gaining a correlation dimension and the like.

The process for calculating the capacity of the reconstructed strange attractor will be described hereinafter.

Assuming that the reconstructed strange attractor is covered with volume elements with a radius r and a shape of, for example, a sphere or a hexahedron, and that the number of the volume elements necessary to cover entirely the attractor is N(r), the relation $N(r) = kr^D$ is satisfied.

In a case that the radius r is reduced enough, then n(r) is solved with regard to the D, the capacity of attractor $D_{cap}$ satisfies the following equation:

$$D_{cap} = \lim_{r \to 0} \frac{\ln N(r)}{\ln(1/r)}$$

The process for gaining the capacity of attractor is carried out by using the space, but it does not use the information accompanying the state variation of the given dynamics system.

Namely, the information dimension employs the following equation in analyzing the quantitative feature of the attractor which is reconstructed by using the information accompanying the state variation of the dynamics system.

$$\text{Information dimension } (D_r) = \lim_{r \to 0} \frac{\ln I(r)}{\ln (1/r)}$$

$$\text{wherein, } I(r) = -\sum_{i=1}^{N(r)} P_i \ln P_i.$$

The $P_i$ represents a probability in which the trace enters the n-th volume element, and I(r) represents an entropy of the given dynamics system.

In the meanwhile, the most convenient procedure for analyzing the quantitative feature of the reconstructed attractor is to gain the correlation dimension. This method will be described with detail hereinafter.

First, it is gained that the number of states present in a circle having a radius Ri which corresponds to the distance between two states Xi and Xj. The gained number of the states is divided by the square number of the state value (N) of the attractor, that is, $N^2$. As the whole number (N) is approached to the infinite, the correlation sum C(R) of the state Xi satisfying the following equation (1) can be obtained:

$C(R) = \lim 1/N^2$ {the number of states $(Xi, Xj)$ such that $||X_i - X_j|| < R$} (1).

With the above calculated correlation sum C(R), the correlation dimension Dc can be calculated by using the following equation:

$$D_c = \lim_{R \to 0} \frac{\ln C(R)}{\ln (R)}$$

The correlation dimension Dc stands for the slope of the linear part of a graph of the correlation sum C(R) which is calculated by the equation (1).

Namely, the graph of the correlation sum C(R) calculated by the equation (1) is plotted in a form convergent toward a certain value. However, the attractor which is constructed by the noise is plotted in a divergent form.

And, the correlation dimension Dc of the attractor is obtained from the slope of the linear part of the graph which is gained by the equation (1).

As described above, in analyzing the quantitative feature of the reconstructed strange attractor, a circuit seeking the correlation dimension is called a chaos processor.

In the prior art, the chaos processor requires a great large amount of calculation works, in that the correlation sum is to obtained from the whole states X1, X2, . . . , Xn. Namely, in order to get the correlation sum, the calculation which is equivalent to the square number of the whole states $N^2$ ($N^2 = N(N-1)/2$) is needed. The more the number of state values, the real time processing for the calculation becomes more hardly achieved by use of a common computer. It is also impossible to use the result of chaos system in the real time.

SUMMARY OF THE INVENTION

It is therefore an object of the invention to provide a chaos feedback system including a chaos processor in which an exclusive processor for calculating a correlation dimension of attractor is realized by a hardware, thereby achieving the real time processing, which system is capable of feeding the result outputted from the chaos processor back to the chaos system.

In accordance with the present invention, this object can be accomplished by providing a chaos feedback system comprising: a chaotic system for deriving a stable state solution from input states, the chaotic system having a strange attractor obtained from the stable state solution; a chaos processor for outputting a correlation dimension to analyze a quantitative feature from a state value of said strange attractor in real time; and a chaos feedback controller for feeding a result outputted from the chaos processor back to the chaotic system so that the chaotic system outputs a desired state value.

BRIEF DESCRIPTION OF THE DRAWINGS

The various features and advantages of the present invention may be more readily understood with reference to the following detailed description taken in conjunction with the accompanying drawings in which.

DETAILED DESCRIPTION OF THE PREFERRED EMBODIMENTS

Figure 1:
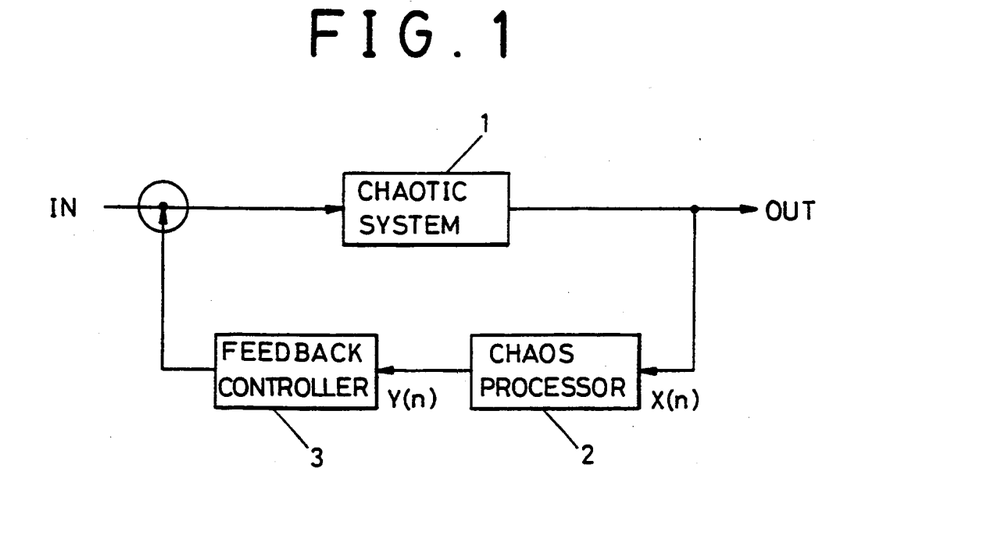
FIG. 1 is a block diagram illustrating a chaos feedback system in accordance with a first embodiment of the present invention.

FIG. 1 is a block diagram illustrating a feedback system in accordance with a first embodiment of the present invention. As shown in FIG. 1, the chaos feedback system comprises a chaotic system 1 having a strange attractor, a chaos processor 2 for analyzing a quantitative feature of the attractor from state values X(n) of the strange attractor outputted from the chaotic system 1 and outputting a correlation dimension, and a feedback control part 3 for feeding the result outputted from the chaos processor 2 back to the chaotic system 1 and controlling the chaotic system 1 to output desired state values X(n) from the chaotic system 1.

There are two objects of the feedback control part 3: one is to select a desired behavier from among the infinite variety of behaviers naturally present in chaos systems, and then stabilize this behavier by applying only small changes to an accessible system parameter, the other is to direct chaotic trajectories rapidly to a desired state.

That is, the chaos processor 2 and the feedback control part 3 form a loop.

Figure 7:
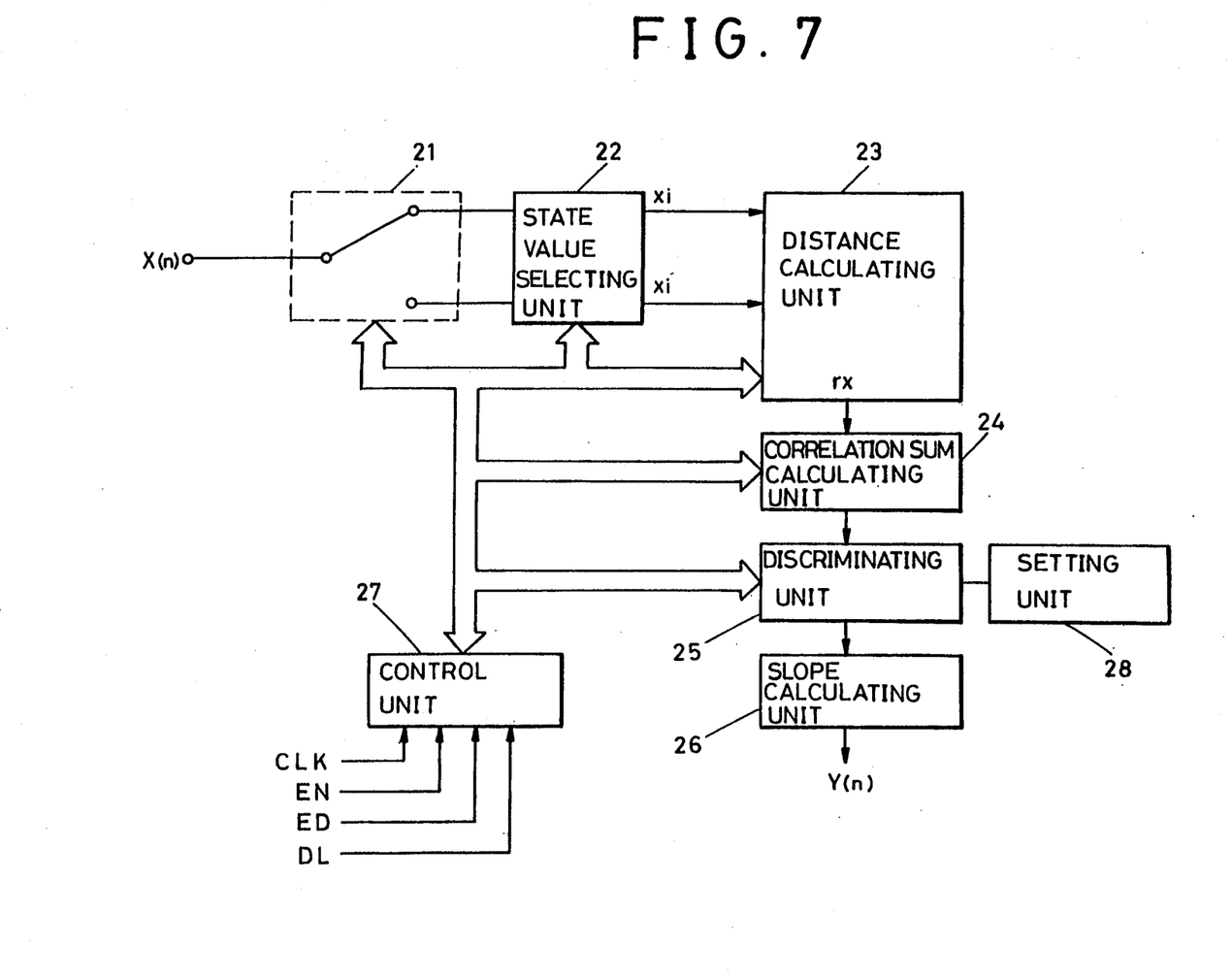
FIG. 7 is a block diagram illustrating a chaos processor which is employed for constituting the feedback system of the present invention.

Referring to FIG. 7, there is illustrated the chaos processor 2 which is employed for constituting the feedback system of the present invention. As shown in FIG. 7, the chaos processor 2 comprises a switching unit 21 adapted to switch state values Xi of the chaotic system 1, which is to be analyzed, sequentially with the lapse of time and to output them, a state value selecting unit 22 adapted to select state values outputted from the switching unit 21, based on an embedding dimension ED and a delay time DL, and a distance calculating unit 23 adapted to calculate a distance Ri, based on two state values Xi and Xj selected in the state value selecting unit 22 and to output the distance Ri. A correlation sum calculating unit 24 is also provided, which is adapted to compare the distance Ri outputted from the distance calculating unit 23 with a previously stored distance index dj and output a correlation sum C(r) corresponding to the distance index which meets a given distance condition. The chaos processor 2 also comprises an inflection point discriminating unit 25 adapted to discriminate suitable inflection points of the correlation sum C(r) outputted from the correlation sum calculating unit 24, a slope calculating unit 26 adapted to calculate a slope of a line connecting the inflection points and output the correlation dimension Dc, and a control unit 27 adapted to control the switching unit 21, the state value selecting unit 22, the distance calculating unit 23, the correlation sum calculating unit 24 and the discriminating unit 25, based on input clocks CLK, enable signals EN, the embedding dimension ED and the delay time DL.

The state value selecting unit 22 includes a pair of registers. A setting unit 28 is connected to the other input of the discriminating unit 25, so as to input an optimum inflection point from outside at the discriminating unit 25.

Operation of the chaos feedback system according to the present invention will now be described, in conjunction with the annexed drawings.

When the chaotic system 1 receives states, it derives a strange attractor from the input states IN. The derived strange attractor is fed to the chaos processor 2.

The chaos processor 2 calculates a correlation dimension Y(n) indicative of the quantitative feature of the inputted strange attractor. The calculated correlation dimension Y(n) is applied to the feedback control part 3 which, in turn, varies a transfer function F(n) carried in the chaotic system 1 or states being received in the chaotic system 1, thereby enabling a desired output value OUT to be obtained.

Hereinafter, the operation of the chaos processor employed in the chaos feedback system of the present invention will be described, in conjunction with FIGS. 7 to 9.

First, the description will be made, in conjunction with an example of an embedding dimension ED=1 and a delay time DL=$\tau$=t.

As a state of the chaotic system 1 having the strange attractor is received in the chaos processor 2, the input state X(n) is applied to the state selecting unit 22 through the switching unit 21 which is switched according to a control signal from the control unit 27.

Assuming that an initial state value of the inputted state X(n) is X(t0), the initial state value X(t0) is fed to the state selecting unit 22 through the switching unit 21. State values which are continuously inputted at every delay time $\tau$ are applied to the state selecting unit 22 through the switching unit 21.

Namely, the initial state value X(t0) is first inputted at the state selecting unit 22. Then, the state selecting unit 22 receives a state value X(t0+$\Delta$t) at the delay time t0+$\Delta$t. The state values X(t0) and X(t0+$\Delta$t) are then applied to the distance calculating unit 23 according to a control signal from the control unit 27.

Figure 8:
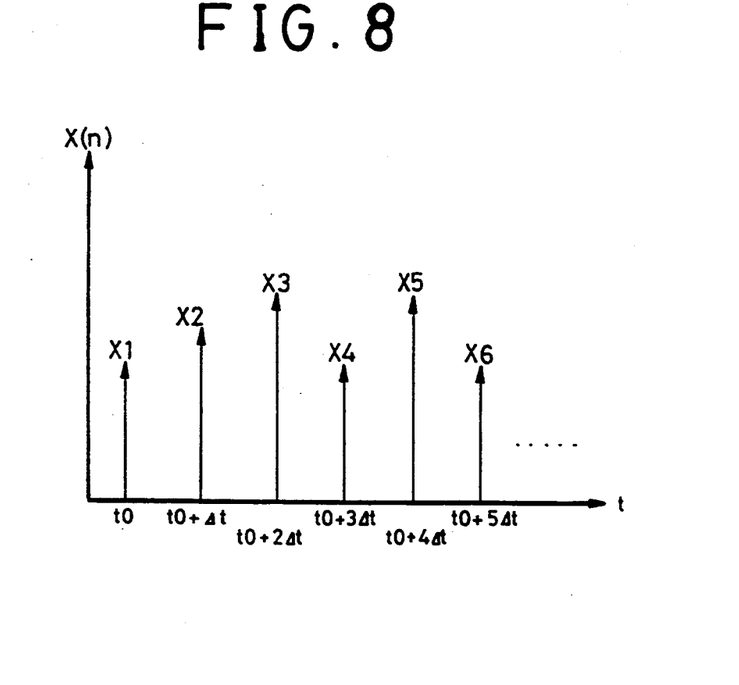
FIG. 8 is a time-state diagram which is plotting an example of state values inputted at the chaos processor which is employed for constituting the feedback system of the present invention.
Figure 9:
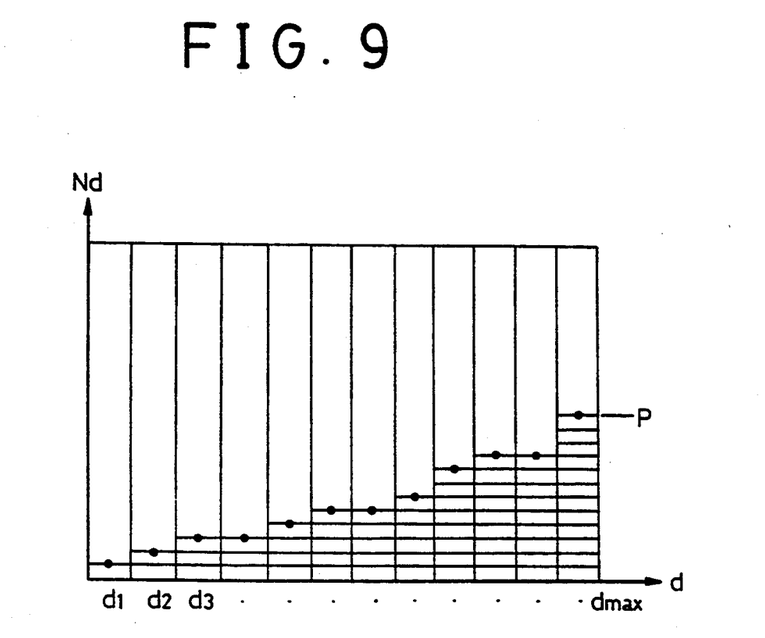
FIG. 9 is a diagram illustrating the relationship between the distance index and the number of states, which is plotting correlation sum calculated by the chaos processor which is employed for constituting the feedback system of the present invention.

The distance calculating unit 23 stores the inputted state values X(t0) and X(t0+$\Delta$t) in its registers for a predetermined time and then outputs them as state values with the lapse of time, as shown in FIG. 8.

With the outputted state values X(t0) and X(t0+$\Delta$t), the distance calculating unit 23 calculates a distance R1 between the two state values X(t0) and X(t0+$\Delta$t). At this time, the embedding dimension ED is 1 and the delay time $\tau$ is $\Delta$t. Accordingly, the distance R1 can be obtained from an operation using the following equation:

$$R1 = [X(t0) - X(t0+\Delta t)]^2.$$

The calculated distance R1 is applied to the correlation sum calculating unit 24 which, in turn, compares the inputted distance R1 with the previously stored distance index di and increments the distance index di by one when the condition of R1>di is satisfied, to obtain an incremented distance index dj.

Namely, the incremented distance index dj satisfies the following equation (2):

$$dj = di + 1 \quad (2)$$

wherein, i<j.

The above procedure is performed for the delay time Δt. The switching unit 21 supplies a state value X(t0+2Δt) received therein at the next delay time 2 t. Based on the inputted state value X(t0+2Δt) and the initial state value X(t0), the distance calculating unit 23 outputs a distance R2 between the two state values.

The outputted distance R2 is compared with the previously stored distance index dj through the correlation sum calculating unit 24. When the compared result satisfies the condition of R2>dj, the distance index dj is incremented.

The above procedures are repeated with respect to all state values received with the lapse of delay time. When the number of states Ndj, which is present in a circle having a diameter corresponding to the incremented distance index, reaches a predetermined final number Dmax, no input state value is applied to the state value selecting unit 22.

Namely, in such a case that the number of states Ndj present in the circle having the diameter which corresponds to the distance index dj has been determined to reach the final number Max through the correlation sum calculating unit 24, the control signal from the control unit 27 is supplied to the switching unit 21 so that the switching unit 21 is switched. By the switching operation of switching unit 21, the supplying of state value to the state value selecting unit 22 is shut off.

In the mean while, the discriminating unit 25 receives a control signal from the control unit 27 and selects the distance indexes di and dj having a suitable inflection point in a diagram which represents the number of states Ndj presented in the circle having the diameter corresponding to the inputted distance index. The diagram is illustrated in FIG. 9.

The inflection point may be selected as the distance index di and dj previously set in the discriminating unit 25, or the user may set the inflection point through the setting unit 28 at outside.

Where distance indexes have been previously set through the discriminating unit 25, in order to derive the inflection point, a distance index is selected from optional distance indexes di and dj. A search is made for a distance index which satisfies the minimum distance from a line connecting the selected distance index and the other distance index. Once the distance index is found, a procedure for setting the found distance index as the inflection point is performed to determine a suitable inflection point. Where the distance index is determined by the setting unit 28, the optimum inflection point predetermined experimentally in the dynamics system to be analyzed is determined from outside.

The inflection point determined as above is fed to the slope calculating unit 26. Where an X-Y coordinate plane is made by an axis d-axis indicative of the distance index and an axis Nd indicative of the number of state values being present in a circle with a diameter equivalent to the distance index, the slope calculating unit 26 calculates a slope resulted from the incremented number of state values.

At this time, the slope is calculated by using the following equation (3)

$$\text{Slope} = (1/N)(\log(Ndj) - \log(Ndi))/(\log(dj) - \log(di)) \quad (3)$$

The calculated slope is the correlation dimension of the chaotic system 1, namely, a final output Y(n) of the chaos processor 2.

The correlation dimension of the chaotic system, which is obtained on the assumption that the embedding dimension ED is 1, and the delay time DL is t, refers to as a correlation dimension according to the pointwise method.

Where the embedding dimension ED and the delay time DL are assumed as n and t+p, respectively, and a n-th order chaotic system is employed, the state value selecting unit 22 outputs state values Xi at the time t0 through the switching unit 21 for the time (n−1)pΔt.

The state values can be expressed by the following equation:

$$Xi = [X(t0), X(t0+pΔt), \ldots, X(t0+(n-1)pΔt)].$$

Also, the state values Xj at the time t0+t can be expressed by the following equation:

$$Xj = [X(t0+Δt), X(t0+(p+1)Δt), \ldots, X(t0+npΔt)].$$

The distance value R1 calculated from the above state values is $[Xj - Xi]^2$. Based on the calculated distance, the correlation dimension Y(n) can be obtained through the correlation calculating unit 24, the discriminating unit 25, the slope calculating unit 26, and the control unit 27. The correlation dimension Y(n) refers to as a correlation dimension according to a full method.

The correlation dimension Y(n) from the chaos processor 2 is fed to the feedback control part 3 which, in turn, compares the inputted correlation dimension with a desired correlation dimension and varies states being received in the chaotic system 1, according to the result of the comparison, thereby enabling a desired output value OUT to be obtained.

Figure 2:
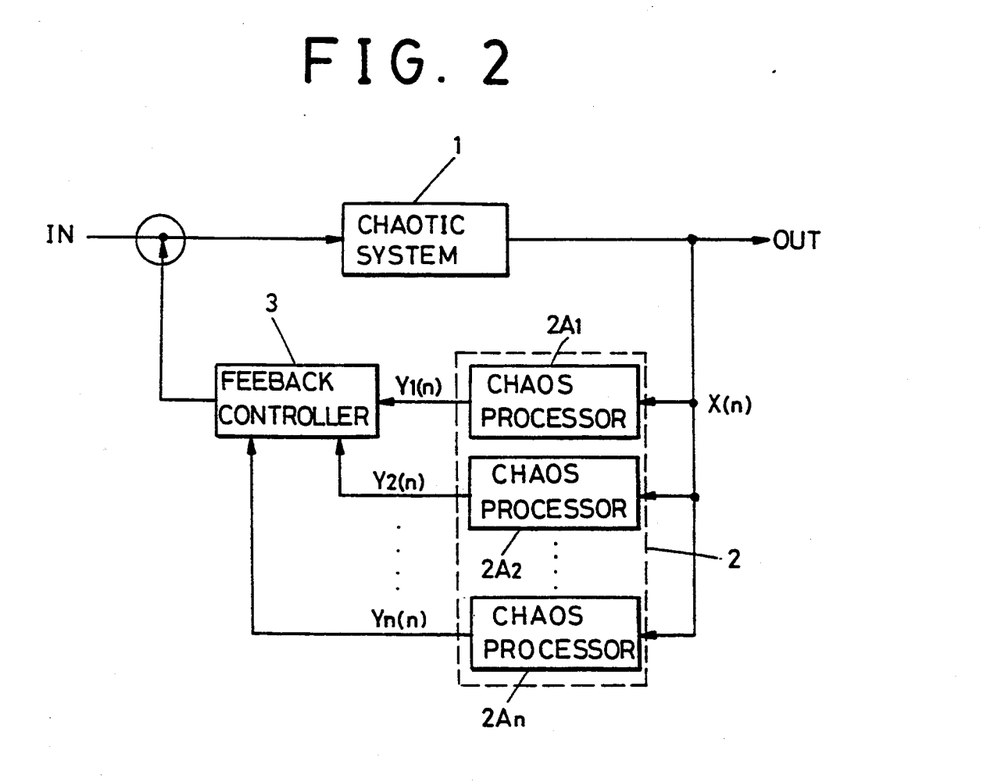
FIG. 2 is a block diagram illustrating a chaos feedback system in accordance with a second embodiment of the present invention.

FIG. 2 is a block diagram illustrating a chaos feedback system according to a second embodiment of the present invention. In this embodiment, a plurality of chaos processors 2A1 to 2An are connected between the chaotic system 1 and the feedback control part 3, so as to handle input state values in parallel.

The chaotic system 1 and the feedback control part 3 of the second embodiment operate in the same manner as those of the first embodiment shown in FIG. 1. State values X(n) from the chaotic system 1 are fed to all the chaos processors 2A1 to 2An. The chaos processors 2A1 to 2An have different embedding dimensions and different delay times and serve to derive respective correlation dimensions Y1(n) to Yn(n) and feed them to the feedback control unit 3.

Figure 3:
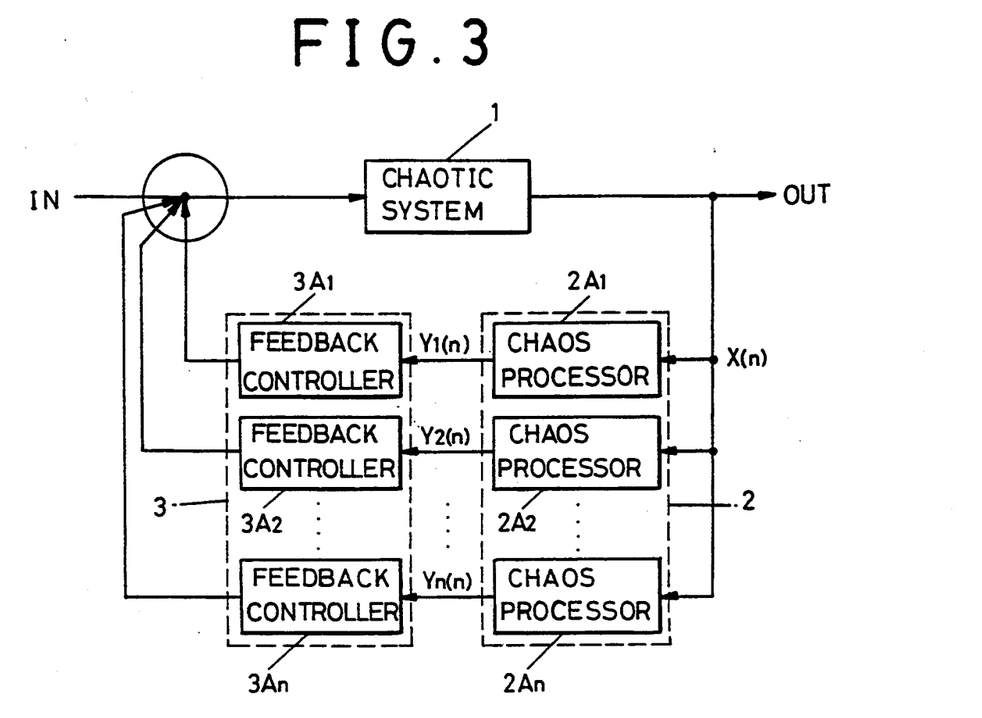
FIG. 3 is a block diagram illustrating a chaos feedback system in accordance with a third embodiment of the present invention.

FIG. 3 is a block diagram illustrating a chaos feedback system according to a third embodiment of the present invention. In this embodiment, a plurality of feedback control parts 3A1 to 3An are connected to outputs of the chaos processors 2A1 to 2An connected in parallel, respectively, so that final output values Y1(n) to Yn(n) outputted from respective chaos processors 2A1 to 2An are fed back to the chaotic system 1.

The chaotic system 1 of the third embodiment operates in the same manner as that of the first embodiment shown in FIG. 1. The chaos processor 2A1 to 2An operate in the same manner as those of the second embodiment shown in FIG. 2. Correlation dimensions Y1(n) to Yn(n) from respective chaos processors 2A1 to 2An are fed to respective feedback control parts 3A1 to 3An.

As the feedback control parts 3A1 to 3An receive the correlation dimension Y1(n) to Yn(n) from the chaos processors 2A1 to 2An, respectively, they vary transfer functions F(n) carried in the chaotic system 1 or input state values IN being received in the chaotic system 1, thereby enabling desired output values OUT to be obtained.

Figure 4:
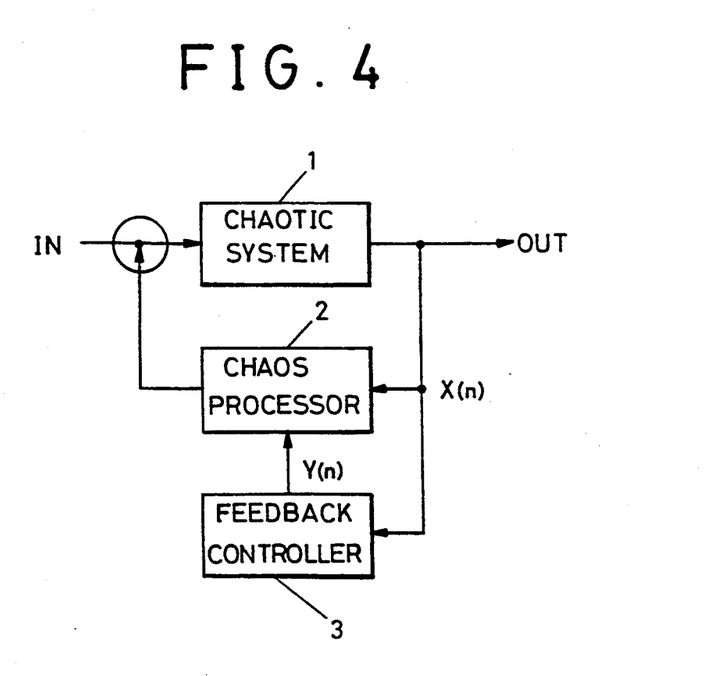
FIG. 4 is a block diagram illustrating a chaos feedback system in accordance with a fourth embodiment of the present invention.

FIG. 4 is a block diagram illustrating a chaos feedback system according to a fourth embodiment of the present invention. In this embodiment, the feedback control part 3 is constructed to receive input states X(n) outputted from the chaotic system 1 and final outputs Y(n) outputted from the chaos processor 2, so that the chaotic system 1 outputs desired states based on the reference of state X(n). The chaotic system 1 and the chaos processor 2 of the fourth embodiment operate in the same manner as those of the first embodiment shown in FIG. 1.

Upon receiving an input state X(n) outputted from the chaotic system 1 and a final output Y(n) outputted from the chaos processor 2, the feedback control part 3 operates to adjust the state value X(n) being received in the chaos processor 2, according to a correlation dimension outputted from the chaos processor 2. The adjusted state value from the feedback control part 3 is fed to the chaotic system 1.

That is, the feedback system according to the fourth embodiment operates with state values X(n) outputted from the chaotic system 1 and correlation dimensions Y(n) outputted from the chaos processor 2 as inputs thereof. Using these state values X(n) and correlation dimensions Y(n), the feedback system operates periodically for checking outputs from the chaotic system 1 or operates only when the feedback control part 3 requires the operation.

Figure 5:
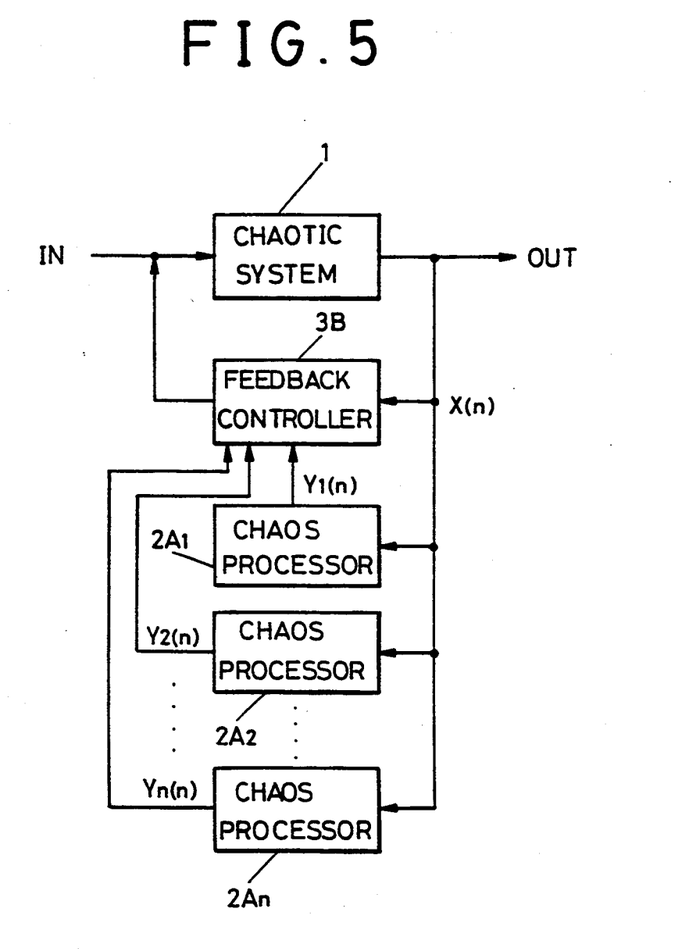
FIG. 5 is a block diagram illustrating a chaos feedback system in accordance with a fifth embodiment of the present invention.

FIG. 5 is a block diagram illustrating a chaos feedback system according to a fifth embodiment of the present invention. In this embodiment, the chaos processor 2 is constituted by n chaos processors 2A1 to 2An, and the feedback control part 3 is constructed to receive input states X(n) outputted from the chaotic system 1 and final outputs Y1(n) to Yn(n) outputted from n chaos processors 2A1 to 2An, so that the chaotic system 1 outputs desired states. The chaotic system 1 of the fifth embodiment has the same construction as that of the first embodiment shown in FIG. 1.

The chaotic system 1 and the feedback control part 3 of the fifth embodiment operate in the same manner as those of the fourth embodiment shown in FIG. 4. States values X(n) from the chaotic system 1 are fed to all the chaos processors 2A1 to 2An. The chaos processors 2A1 to 2An have different embedding dimensions and different delay times and serve to derive respective correlation dimensions Y1(n) to Yn(n) and feed them to the feedback control unit 3.

Figure 6:
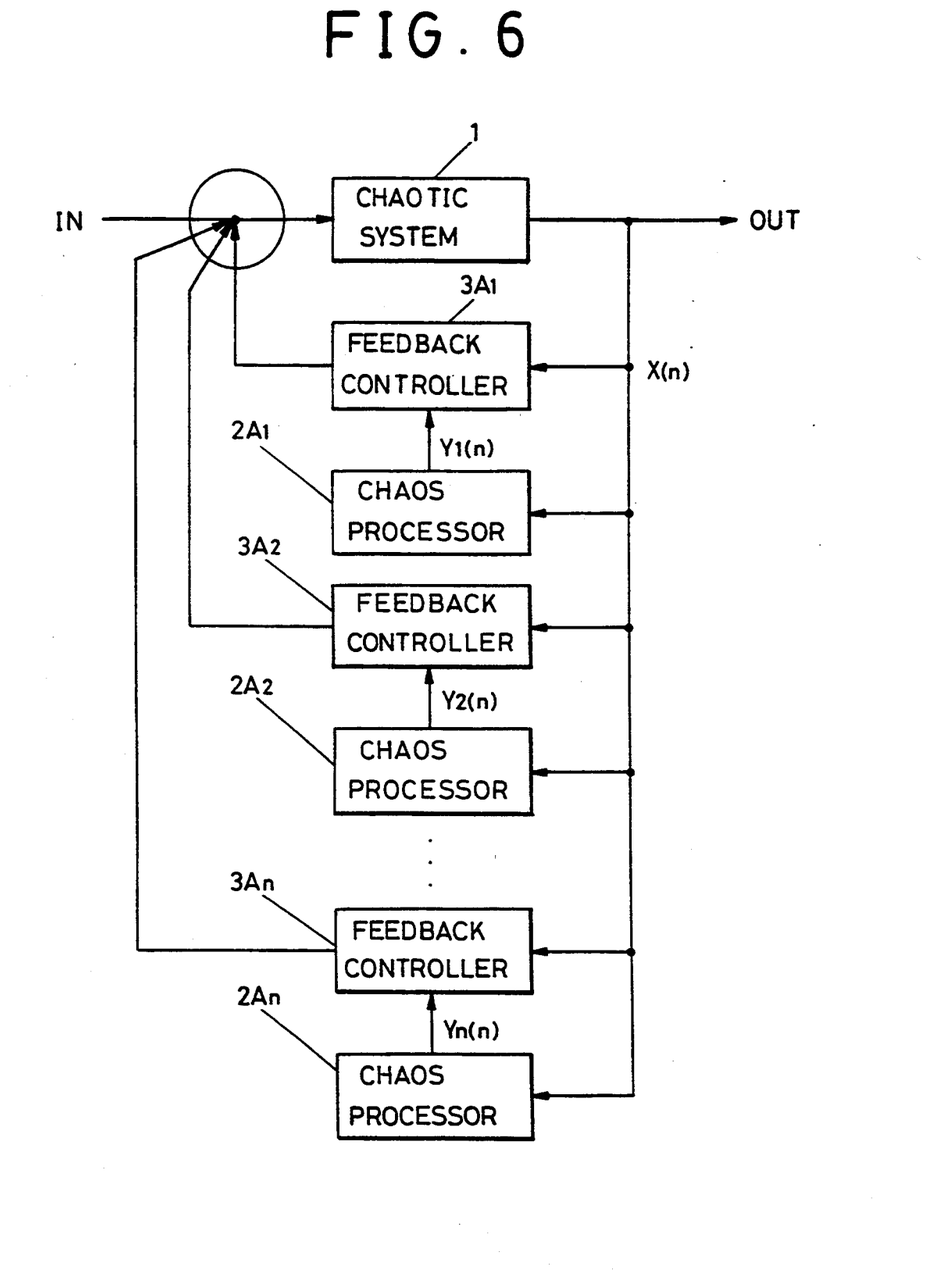
FIG. 6 is a block diagram illustrating a chaos feedback system in accordance with a sixth embodiment of the present invention.

FIG. 6 is a block diagram illustrating a chaos feedback system according to a sixth embodiment of the present invention. In this embodiment, the chaos processor 2 is constituted by n chaos processors 2A1 to 2An, and the feedback control part 3 is constituted by n feedback control parts 3A1 to 3An connected to respective outputs of the chaos processors 2A1 to 2An. The feedback control parts 3A1 to 3An serve to receive input states X(n) outputted from the chaotic system 1 and final outputs Y1(n) to Yn(n) outputted from n chaos processors 2A1 to 2An, respectively, so that the chaotic system 1 outputs desired states. The chaotic system 1 of the sixth embodiment has the same construction as that of the first embodiment shown in FIG. 1.

The chaotic system 1 operate in the same manner as that of the fourth embodiment shown in FIG. 4. The chaos processors 2A1 to 2An operate in the same manner as those of the fifth embodiment of FIG. 5. Correlation dimensions Y1(n) to Yn(n) outputted from respective chaos processors 2A1 to 2An and state values X(n) inputted at the chaos processors 2A1 to 2An are fed to respective feedback control parts 3A1 to 3An.

As the feedback control parts 3A1 to 3An receive the correlation dimension Y1(n) to Yn(n) and the state values X(n), respectively, they vary transfer functions F(n) carried in the chaotic system 1 or input state values IN being received in the chaotic system 1, so that the chaotic system 1 outputs desired output values OUT.

As apparent from the above description, the present invention provides a feedback system which is capable of varying transfer functions carried in its chaos system or input state values being received in the chaos system in real time, according to correlation dimensions for analyzing qualitative features of the strange attractor of chaos system, so that the chaos system outputs desired state values.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A chaos feedback system comprising:
   a chaotic system for deriving a stable state solution from input states, said chaotic system having a strange attractor obtained from said stable state solution;
   chaos processor means for outputting a correlation dimension to analyze a quantitative feature from a state value of said strange attractor; and
   chaos feedback controller means for feeding a result outputted from said chaos processor means back to the chaotic system so that the chaotic system outputs a desired state value;
   said chaos processor means comprising a plurality of chaos processors for deriving correlation dimensions for state values inputted with different embedding dimensions and different delay times, respectively.

2. A chaos feedback system in accordance with claim 1, wherein said chaos feedback controller means comprises a plurality of feedback control parts for receiving said correlation dimensions from said chaos processors, respectively, so that said chaotic system outputs a desired state value.

3. A chaos feedback system in accordance with claim 1, wherein said chaos feedback controller means is adapted to receive said correlation dimension from said chaos processor means and said state value from said chaotic system and vary the state value being outputted from the chaotic system into a desired state value, based on the correlation dimension.

4. A chaos feedback system in accordance with claim 1, wherein said chaos feedback controller means is adapted to receive said correlation dimensions for respective state values inputted with different embedding dimensions and different delay times from said chaos processors and said state values from said chaotic system and vary the state values being outputted from the chaotic system into desired states values.

5. A chaos feedback system in accordance with claim 4, wherein said chaos feedback control means comprises a plurality of feedback control parts for receiving respective of said correlation dimensions from said chaos processors and respective of said state values from said chaotic system, as inputs thereof.

* * * * *